A. F. ETHERIDGE.
MEANS FOR CATCHING INSECTS.
APPLICATION FILED AUG. 10, 1916.
1,214,444.
Patented Jan. 30, 1917.
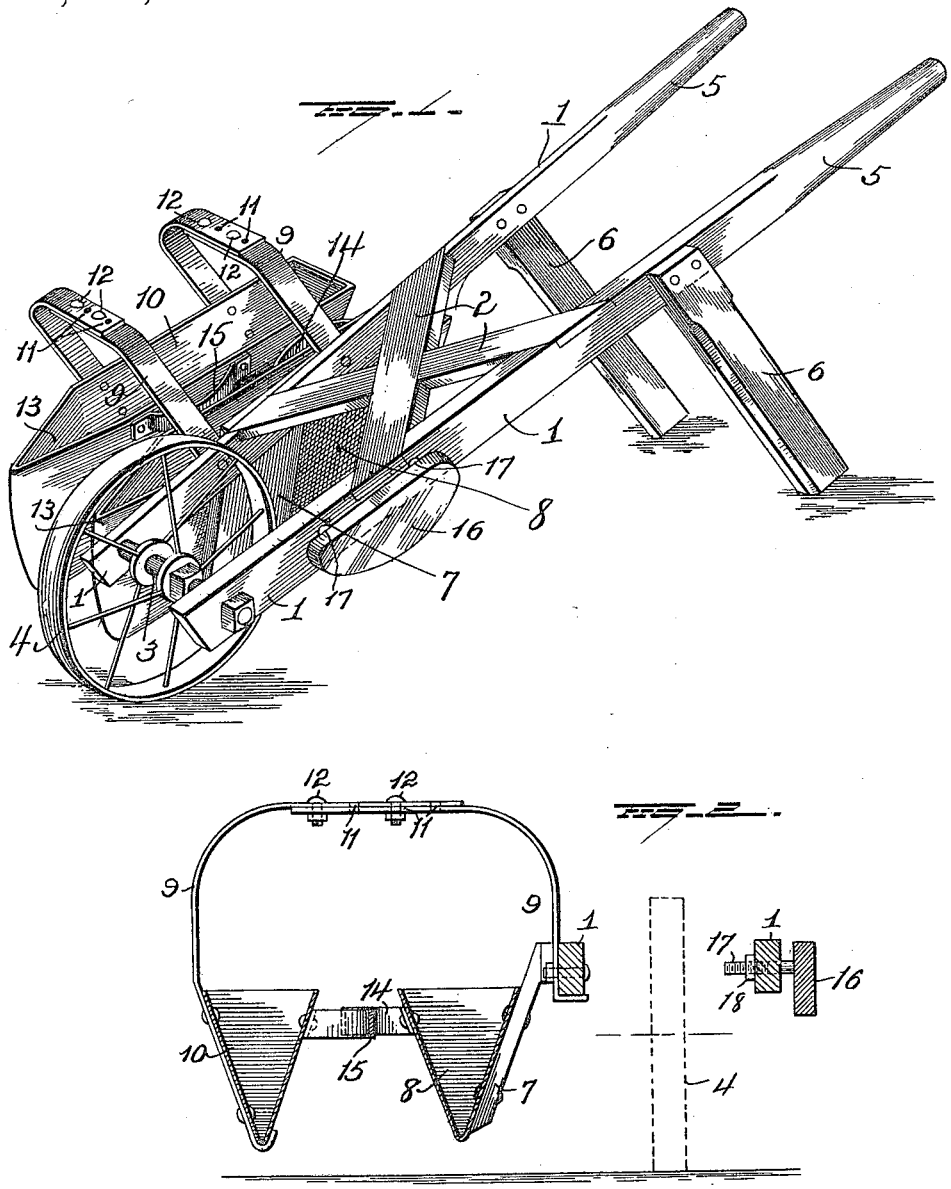
WITNESSES
INVENTOR
A. F. Etheridge
By Seymour & Bright
Attorneys

UNITED STATES PATENT OFFICE.

ALLEN F. ETHERIDGE, OF EVERGREEN, ALABAMA.

MEANS FOR CATCHING INSECTS.

1,214,444. Specification of Letters Patent. Patented Jan. 30, 1917.

Application filed August 10, 1916. Serial No. 114,231.

*To all whom it may concern:*

Be it known that I, ALLEN F. ETHERIDGE, a citizen of the United States, and a resident of Evergreen, in the county of Conecuh and State of Alabama, have invented certain new and useful Improvements in Means for Catching Insects; and I do hereby declare the following to be a full, clear, and exact description of the invention, such as will enable others skilled in the art to which it appertains to make and use the same.

This invention relates to improvements in means for catching insects and more particularly to an improved machine for removing boll weevils and similar insects from growing plants and for catching and destroying such insects.

One object of my invention is to provide a machine of the class specified which shall be simple in construction; which may be readily moved among the plants without injuring or unduly crowding them; and which will operate to shake the plants laterally and cause insects which may be thereon to be thrown into trays provided for their reception.

A further object is to so construct the machine that the body portion thereof may pass between rows of plants or to one side of a row of plants, and so that the receptacles for insects shall travel at respective sides of the plants of an adjacent row and serve to carry the means employed for shaking the plants.

With these and other objects in view, the invention consists in certain novel features of construction and combinations of parts as hereinafter set forth and pointed out in the claims.

In the accompanying drawings, Figure 1 is a perspective view of a machine embodying my improvements, and Fig. 2 is a sectional view.

The main wheeled frame of the machine comprises two bars 1, 1, disposed so as to converge toward their forward ends and may be connected between their ends by crossed braces 2. The axle 3 of a carrying wheel 4 is suitably mounted at or near the forward ends of the side bars of the frame and the rear ends of these side bars terminate in handles 5. Legs 6 may be secured to the side-bars 1 near the handle portions 5 thereof.

A leg 7 depends from one of the side bars 1 at a point rearwardly of its forward end, and to this leg, a receptacle 8 is secured so as to be supported near the ground. Arches 9 are also secured at one end to the same side bar 1, near respective sides of the leg 7 and serve to support another receptacle 10,—the latter being thus disposed at one side of the receptacle 8 and spaced laterally therefrom, so that said receptacles may travel at respective sides of a row of plants. Each arch 9 may be made in two parts which overlap and a plurality of holes 11 may be provided whereby the two sections of the respective arches may be adjustably secured together by means of bolts 12. By adjusting the arches, the receptacles may be relatively adjusted to accommodate the machine to the sizes of the plants to be operated upon.

The two receptacles are the same in construction and each may be made of sheet metal in the form of a trough having V-shaped cross section and contracted at the forward end to present a V-shaped form as indicated at 13 so as to avoid the presence of shoulders or corners which might injure the plants.

A curved arm or cam 14 is secured to one side of the receptacle 8 near the rear end and upper edge thereof and a similar curved arm or cam 15 is secured to the inner side of the receptacle 10 near the upper edge thereof and forwardly of the position of the arm or cam 14.

The body portion of the machine may be moved alongside of a row of plants so that the receptacles 8—10 will travel at respective sides of the plants of the row. As the machine moves forwardly, a plant will first be engaged by the curved arm 15 on the outer receptacle 10 and will be jarred laterally thereby toward the receptacle 8 and then the same plant will be jarred laterally in the reverse direction (toward the receptacle 10) by the action of the cam 14 on the receptacle 8. In this manner, each plant will be jarred laterally in both directions and any boll weevils or other insects thereon will be shaken off and caused to drop into one receptacle or the other.

In order to counterbalance the receptacles 8—10, a weight 16 is applied to the frame at the side opposite said receptacles and may be attached to the frame by means of a threaded bolt 17 provided with a nut 18.

The respective receptacles will contain kerosene or other material for destroying the insects.

Having fully described my invention what I claim as new and desire to secure by Letters-Patent, is:

1. In a device of the character described, the combination with a wheeled frame, of arches secured to one side thereof and projecting laterally from said frame, a receptacle secured to the outer arms of said arches, a receptacle disposed between said first-mentioned receptacle and the wheeled frame, said receptacles being spaced apart, and plant engaging means projecting from the opposing sides of the respective receptacles.

2. A device for catching insects, comprising a barrow, arches secured to one side only of said barrow, and projecting laterally therefrom, said arches each comprising two members adjustably connected together, a receptacle secured to the outer end portions of said adjustable arches, another receptacle secured to the side of the barrow and spaced from the receptacle carried by the arches, curved arms secured to the inner sides of said receptacles, one of said curved arms being in advance of the other, and means for counterbalancing said receptacles.

In testimony whereof, I have signed this specification in the presence of two subscribing witnesses.

ALLEN F. ETHERIDGE.

Witnesses:
S. W. BROWN,
R. H. BROOKS.

Copies of this patent may be obtained for five cents each, by addressing the "Commissioner of Patents, Washington, D. C."